US012084912B2

(12) United States Patent
Lim

(10) Patent No.: US 12,084,912 B2
(45) Date of Patent: Sep. 10, 2024

(54) ASSEMBLY TYPE VENTILATION DEVICE FOR WINDOWS AND DOORS

(71) Applicant: Mi Ran Lim, Seongnam-si (KR)

(72) Inventor: Mi Ran Lim, Seongnam-si (KR)

( * ) Notice: Subject to any disclaimer, the term of this patent is extended or adjusted under 35 U.S.C. 154(b) by 448 days.

(21) Appl. No.: 17/298,587

(22) PCT Filed: Nov. 28, 2019

(86) PCT No.: PCT/KR2019/016642
§ 371 (c)(1),
(2) Date: May 30, 2021

(87) PCT Pub. No.: WO2020/111845
PCT Pub. Date: Jun. 4, 2020

(65) Prior Publication Data

US 2022/0056757 A1 Feb. 24, 2022

(30) Foreign Application Priority Data

Nov. 29, 2018 (KR) ........................ 10-2018-0151174

(51) Int. Cl.
*E06B 7/10* (2006.01)
*E06B 9/52* (2006.01)
(Continued)

(52) U.S. Cl.
CPC .................. *E06B 7/10* (2013.01); *E06B 9/52* (2013.01); *F24F 7/003* (2021.01); *F24F 7/013* (2013.01); *F24F 8/108* (2021.01); *F24F 13/20* (2013.01); *F24F 13/28* (2013.01); *E06B 2009/527* (2013.01); *F24F 2110/64* (2018.01); *F24F 2221/36* (2013.01)

(58) Field of Classification Search
CPC ..... E06B 7/02; E06B 7/10; E06B 9/52; E06B 2009/527; E06B 2007/023; F24F 7/003; F24F 7/013; F24F 8/108; F24F 13/20; F24F 13/28; F24F 2110/64; F24F 2221/20; F24F 2221/36; F24F 2110/34; B01D 24/045; B01D 24/005; B01D 2267/60; B01D 2267/50
USPC .......................................................... 454/196
See application file for complete search history.

(56) References Cited

U.S. PATENT DOCUMENTS 3,698,308 A * 10/1972 Navara ..................... E06B 7/03 55/385.2
4,486,204 A * 12/1984 Marijnissen .............. F24F 8/10 55/504

(Continued)

FOREIGN PATENT DOCUMENTS

CN 205037456 U * 2/2016
CN 105570998 A * 5/2016

(Continued)

*Primary Examiner* — Edelmira Bosques
*Assistant Examiner* — Frances F. Hamilton
(74) *Attorney, Agent, or Firm* — Maschoff Brennan

(57) ABSTRACT

An assembly type ventilation device for windows and doors is disclosed. The assembly type ventilation device for windows and doors comprises: a filter frame provided with an insertion part into which an air filter module is detachably inserted and fixed; a first fixing part installed on one side of the filter frame and fixed to a window; and a second fixing part installed on the other side of the filter frame and fixed to a window frame.

10 Claims, 14 Drawing Sheets

(51) Int. Cl.

| | |
|---|---|
| ***F24F 7/003*** | (2021.01) |
| ***F24F 7/013*** | (2006.01) |
| ***F24F 8/108*** | (2021.01) |
| ***F24F 13/20*** | (2006.01) |
| ***F24F 13/28*** | (2006.01) |
| *F24F 110/64* | (2018.01) |

(56) References Cited

U.S. PATENT DOCUMENTS

| | | | | |
|---|---|---|---|---|
| 5,492,551 | A * | 2/1996 | Wolfe | A62B 23/025<br>55/DIG. 39 |
| 9,827,521 | B2 * | 11/2017 | Simmons | E06B 9/24 |
| 2004/0065029 | A1 * | 4/2004 | Morris | F24F 13/28<br>52/204.5 |
| 2005/0279063 | A1 * | 12/2005 | Simmons | B01D 46/0005<br>55/495 |
| 2007/0135034 | A1 * | 6/2007 | Lack | B60J 1/20<br>454/196 |
| 2008/0290244 | A1 * | 11/2008 | Albright | E06B 7/28<br>248/544 |
| 2013/0199140 | A1 * | 8/2013 | Mock | B01D 46/0097<br>55/484 |
| 2016/0184754 | A1 * | 6/2016 | Choy | B01D 46/0005<br>55/385.1 |
| 2017/0007951 | A1 * | 1/2017 | DeChristofaro | B01D 46/0005 |
| 2017/0241192 | A1 * | 8/2017 | Fox | F24F 8/108 |
| 2017/0363318 | A1 * | 12/2017 | White | B01D 46/12 |
| 2018/0106097 | A1 * | 4/2018 | Ralston | E06B 3/4654 |
| 2018/0133636 | A1 * | 5/2018 | Lalama | B01D 46/645 |
| 2019/0277517 | A1 * | 9/2019 | Nanjappa | F24F 8/108 |

FOREIGN PATENT DOCUMENTS

| | | | | | |
|---|---|---|---|---|---|
| CN | 106801575 | A | * | 6/2017 | |
| GB | 2558966 | A | * | 7/2018 | B01D 46/0005 |
| JP | 2002239325 | A | * | 8/2002 | B01D 46/0013 |
| JP | 2014228203 | A | * | 12/2014 | |
| KR | 20060134503 | A | * | 12/2006 | |
| KR | 20090026981 | A | * | 3/2009 | |
| KR | 20090095737 | A | * | 9/2009 | |
| KR | 100980199 | B1 | * | 9/2010 | |
| KR | 20-2010-0009711 | U | | 10/2010 | |
| KR | 10-2013-0047723 | A | | 5/2013 | |
| KR | 101548059 | B1 | * | 8/2015 | |
| KR | 20-2017-0001784 | U | | 5/2017 | |
| KR | 10-2017-0111628 | A | | 10/2017 | |
| KR | 10-2018-0000626 | A | | 1/2018 | |
| KR | 101825576 | B1 | * | 3/2018 | |
| KR | 20190123707 | A | * | 1/2019 | |
| KR | 20190029383 | A | * | 3/2019 | |
| KR | 10-1972597 | B1 | | 8/2019 | |
| WO | WO-2017033094 | A1 | * | 3/2017 | |

* cited by examiner

ASSEMBLY TYPE VENTILATION DEVICE FOR WINDOWS AND DOORS

TECHNICAL FIELD

The present invention relates to an assembly type ventilation device for windows and doors, which is installed between a window and a window frame in an assembly type with various shapes to clean indoor air.

BACKGROUND ART

In general, a window has a function of ventilating indoor air as one of functions in various buildings. When a person stays in a room sealed for a long period of time while closing the window, indoor air is polluted, and the polluted indoor air acts as a factor causing various diseases to the human body.

In particular, various dusts and microorganisms in the polluted air cause respiratory diseases and various allergies. Various contaminants generated from indoor building materials, such as formaldehyde, volatile organic matter, and asbestos powder, cause headache, cough, itchiness, dizziness, fatigue, and decreased concentration, and even cause heart disease and cancer.

Accordingly, the indoor air is necessary to be ventilated with outdoor clean air so as to prevent dusts, microorganisms, and various contaminants from accumulating indoors.

However, it is difficult to ventilate frequently since the outdoor air contains contaminants such as fine dust that are more harmful to the body than the indoor air due to recent air pollution.

Accordingly, the air is required to be ventilated by discharging the polluted indoor air, and an indoor air purifier is required to be operated while blocking an air inflow from the outside to remove contaminants such as fine dust introduced from the outside.

DISCLOSURE

Technical Problem

Embodiments of the present invention provide an assembly type ventilation device for windows and doors, which is installed between windows and window frames by adjusting a height and a width to fit sizes of various window frames, installed with a ventilating fan to adjust ventilation speed, and configured to manage indoor air quality in communication with the ventilation fan by measuring the concentration of fine dust in indoor air and outdoor air in real time.

Technical Solution

One embodiment of the present invention includes: a filter frame formed with an insertion part to which an air filter module is detachably inserted and fixed; a first fixing part installed on one side of the filter frame and fixed to a window; and a second fixing part installed on an opposite side of the filter frame and fixed to a window frame.

A first fixing protrusion may protrude from the one side of the filter frame.

The first fixing part may include a first fixing frame detachably fitted and fixed to the first fixing protrusion; and a first support protrusion protruding and fixed to a side surface of the first fixing frame, and inserted and fixed to the window.

A second fixing protrusion may protrude from the opposite side of the filter frame.

The second fixing part may include a second fixing frame detachably fitted and fixed to the second fixing protrusion; and a plurality of second support protrusions detachably protruding and fixed to a side surface of the second fixing frame, and having a side surface fixedly fitted with the window frame.

Insertion protrusions may protrude from both edge sides of a lower portion of the filter frame.

A plurality of the filter frames may be stacked vertically, and the upper portion of the filter frame at a lower position may be inserted and fixed to the insertion protrusions while the filter frames are stacked.

A ventilation module may be detachably installed under the filter frame.

The ventilation module may include a ventilation frame having an upper side inserted to the insertion protrusion of the filter frame, and provided at a lower portion thereof with a fixing protrusion fitted with the window frame; a ventilation fan installed in the ventilation frame; and a fine dust measurement part movably installed along a rail inside the frame while being inserted inside the ventilation frame, and installed therein with a fine dust sensor to control and drive the ventilation fan when fine dust contained in outside air is less than a set concentration or fine dust in indoor air is higher than the set concentration.

The air filter module may include a module frame inserted and fixed to the insertion part of the filter frame; a plurality of air filters inserted and fixed to the module frame; and a cover frame installed therein with an opening/closing part.

The device according to the present invention may further include a driving part receiving a sensing signal of the fine dust sensor to close the opening/closing part when the concentration of fine dust in atmosphere is higher than the set concentration.

One embodiment of the present invention may include a guide frame installed at a position between the stacked air filter modules, and having opposite both edges from which guide protrusions extending to surfaces of the air filter module protrude; a first fixing part installed on one side of the guide frame and fixed to a window; and a second fixing part installed on an opposite side of the guide frame and fixed to a window frame.

The device may further include a connection frame fixed to a stacked upper portion of the filter frame.

The connection frame may include a connection body having a bottom coming into contact with the upper side of the air filter module, and having connection protrusions protruding from edges thereof in a longitudinal direction; a bent portion bent at one side of the connection body so as to be locked and fixed to an upper portion of the first fixing part; coupling protrusions protruding from the one side of the connection body while being spaced apart from both sides of the bent portion; a first insertion groove formed on an opposite side of the connection body; and a second insertion groove formed under the first insertion groove on the opposite side of the connection body.

The filter frame may include a plurality of filter frames stacked vertically and detachably fixed to each other by a magnetic member.

The magnetic member may include a first magnetic member fixed to an upper surface of the filter frame; and a second magnetic member fixed to a lower surface of the filter frame.

Surfaces facing the first magnetic member and the second magnetic member may be coated with silicone while the filter frames are stacked.

Advantageous Effects

According to one embodiment of the present invention, the device is installed in a detachable and prefabricated manner between the window and window frame, so as to be easily installed on windows having various sizes with various heights and widths. Accordingly, indoor pollutants are discharged to the outside and pollutants such as fine dust in the atmosphere are filtered and stably supplied indoors, so that effective ventilation can be facilitated, and user satisfaction can be improved.

According to one embodiment of the present invention, a solar panel for supplying power to the ventilating fan and the driving part is installed on the surface of the opening/closing part, so that the driving power can be used complementarily from a charging unit that can be charged indoors and a solar rechargeable battery.

BEST MODE

Mode for Invention

Hereinafter, the embodiments of the present invention will be described in detail with reference to the accompanying drawings so that those skilled in the art may easily carry out the present invention.

Figure 1:
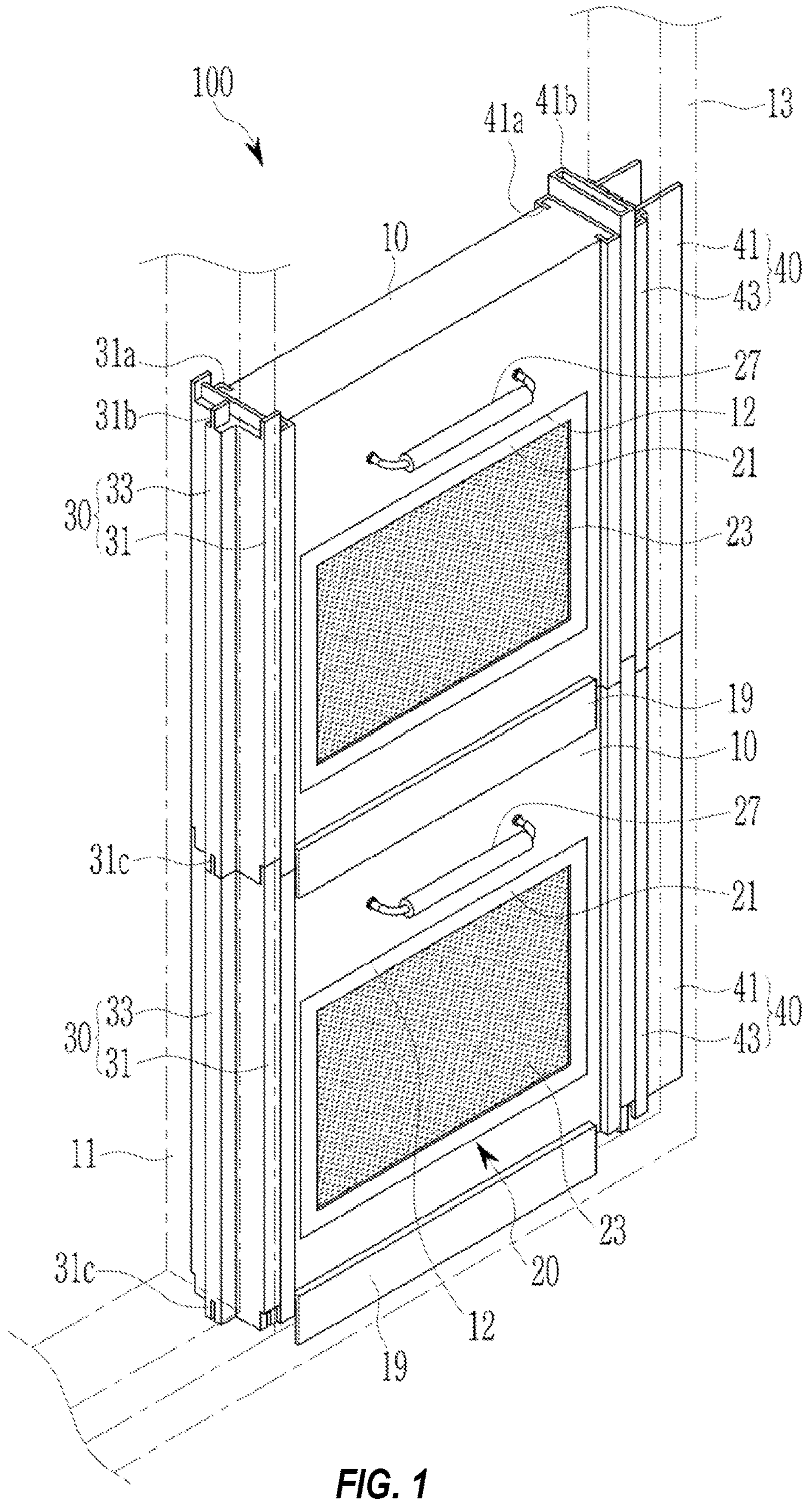
FIG. 1 is a perspective view schematically showing a state in which an assembly type ventilation device for windows and doors according to the first embodiment of the present invention is installed.
Figure 2:
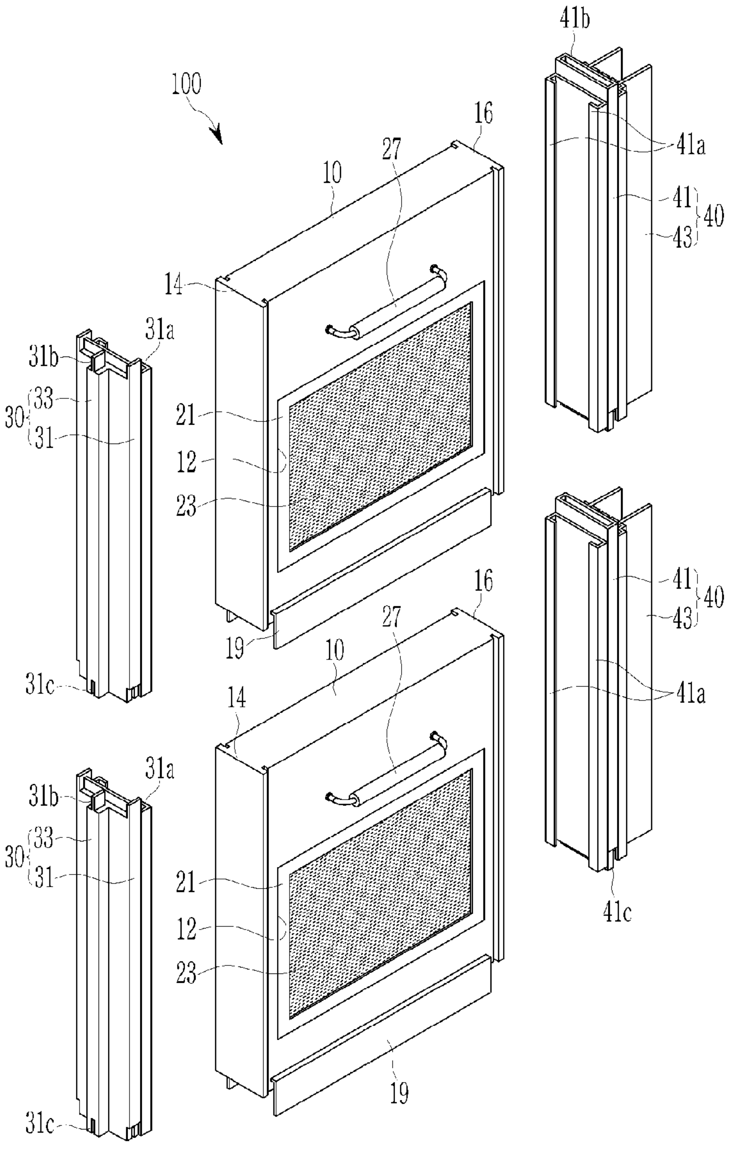
FIG. 2 is an exploded perspective view schematically showing the assembly type ventilation device for windows and doors of FIG. 1.

FIG. 1 is a perspective view schematically showing a state in which an assembly type ventilation device for windows and doors according to the first embodiment of the present invention is installed. FIG. 2 is an exploded perspective view schematically showing the assembly type ventilation device for windows and doors of FIG. 1.

As shown in FIGS. 1 and 2, an assembly type ventilation device 100 for windows and doors according to the first embodiment of the present invention includes: a filter frame 10 formed with an insertion part 12 to which an air filter module 20 is detachably inserted and fixed; a first fixing part 30 installed on one side of the filter frame 10 and fixed to a window; and a second fixing part 40 installed on an opposite side of the filter frame 10 and fixed to a window frame.

The filter frame 10 is installed at a position between a side surface of a window 11 and a window frame 13, and may be detachably installed in a shape of a rectangular frame.

The insertion part 12 into which the air filter module 20 is inserted may be formed in the filter frame 10.

In other words, the insertion part 12 is opened at a center position of the filter frame 10, and the air filter module 20 may be inserted and fixed thereto. The insertion part 12 may have variously modified shape, such as rectangular or round shape, corresponding to a shape of the air filter module 20.

The air filter module 20 is inserted and fixed to the filter frame 10, and may be installed to discharge indoor harmful substances such as radon to the outside and filter external pollutants such as fine dust in the atmosphere.

Figure 3:
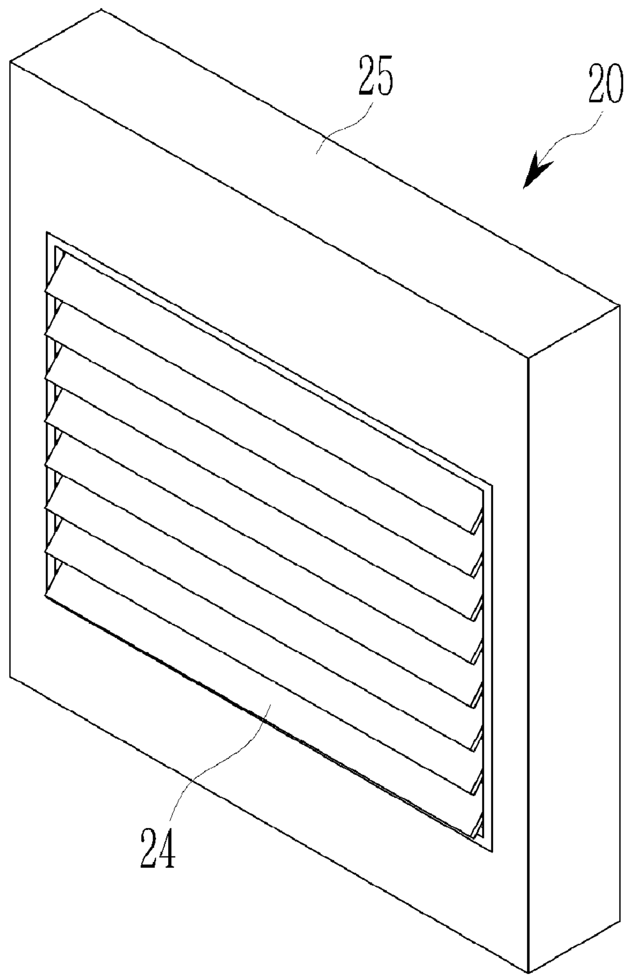
FIG. 3 is a perspective view schematically showing an air filter module according to the first embodiment of the present invention.
Figure 4:
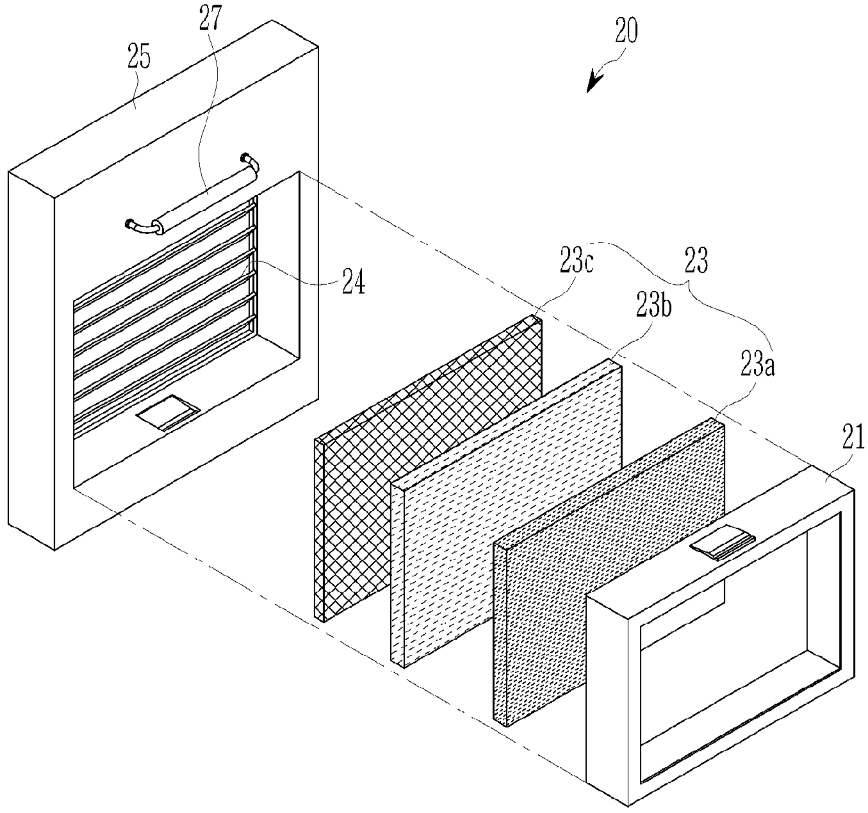
FIG. 4 is an exploded perspective view schematically showing the air filter module of FIG. 3.

FIG. 3 is a perspective view schematically showing an air filter module according to the first embodiment of the present invention. FIG. 4 is an exploded perspective view schematically showing the air filter module of FIG. 3.

As shown in FIGS. 3 and 4, the air filter module 20 may include a module frame 21 inserted and fixed to the insertion part 12 of the filter frame 10, a plurality of air filters 23 inserted and fixed to the module frame 21, a cover frame 25 fixed to the module frame 21 and installed therein with an opening/closing part 24, and a handle part 27 protruding with respect to the module frame 21.

The module frame 21 is inserted into the insertion part 12 of the filter frame 10, and may be formed in a rectangular frame type and installed to be inserted into or ejected from the insertion part 12.

The module frame 21 is fitted and fixed to the cover frame 25, and may be formed therein with a space in which the air filter 23 is installed.

The air filter 23 includes a plurality of air filters installed inside the module frame 21 and the cover frame 25, and the present embodiment exemplarily illustrates the air filter as being provided with a pre-filter **23*a*, an activated carbon filter 23*b*, and a HEPA filter 23*c***.

However, the air filter 23 is not necessarily limited to being provided with the pre-filter 23*a*, the activated carbon filter 23*b*, and the HEPA filter 23*c*, and may also be provided with different types and numbers by changing sizes of the cover frame 25 and the module frame 21.

The cover frame 25 is fitted and fixed to the module frame 21 as described above, and the opening/closing part for selectively exposing the air filter 23 to the atmosphere may be installed to be opened/closed. Herein, the cover frame 25 is exemplarily described as being fitted and fixed, however, the present invention is not limited thereto. The cover frame also may be fixed by a fastening mechanism such as magnetic force of a magnetic member or a bolt member, and fixed surfaces may be siliconized.

The opening/closing part 24 includes a plurality of opening/closing parts provided to be opened and closed in the cover frame 25, and may be manually opened and closed by a user or automatically opened and closed by driving of a driving unit (not shown).

The above-described air filter module 20 may be easily replaced by detachably installing the module frame 21 and the air filter 23 in a sliding type indoors.

Meanwhile, the first fixing part 30 and the second fixing part 40 may be detachably fixed to both sides of the filter frame 10.

To this end, a first fixing protrusion 14 and a second fixing protrusion 16 may protrude from the both sides of the filter frame 10.

One side of the first fixing part 30 may be detachably fixed to the first fixing protrusion 14 by fitting fixing.

Figure 5:
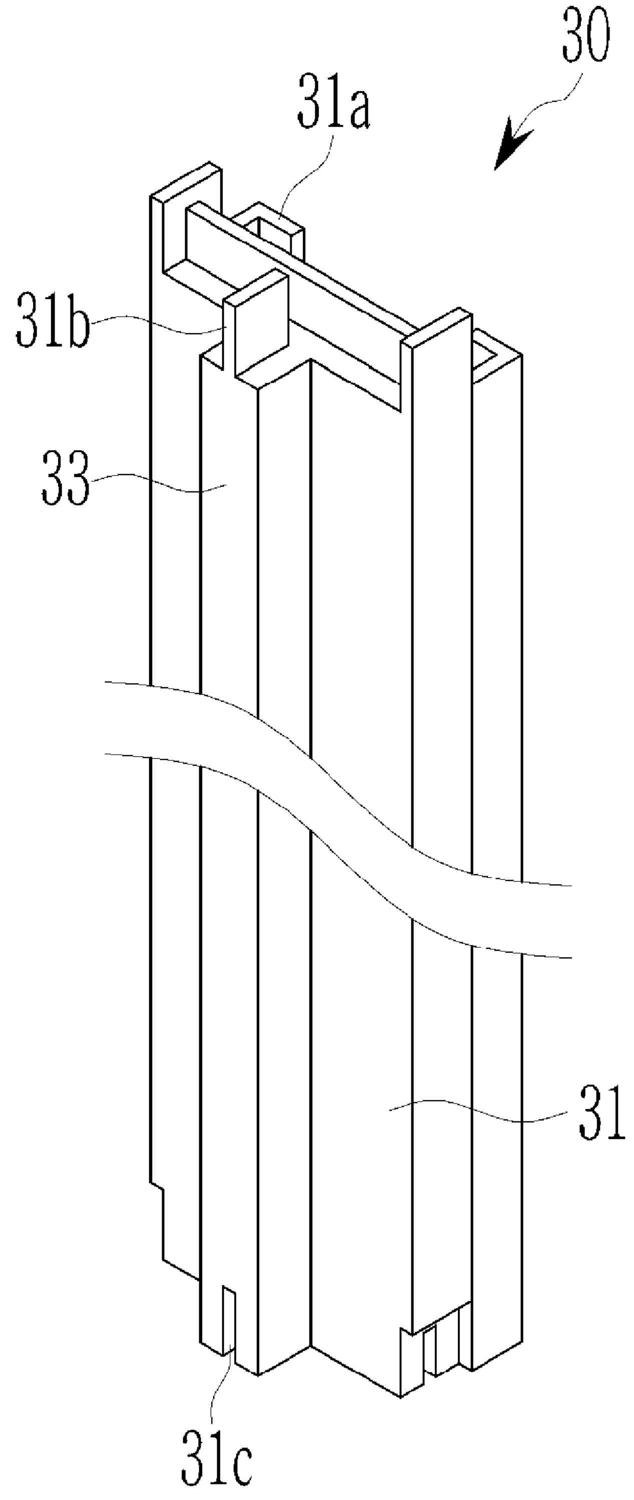
FIG. 5 is a perspective view schematically showing a main portion of a first fixing part according to the first embodiment of the present invention.

FIG. 5 is a perspective view schematically showing a main part of a first fixing part according to the first embodiment of the present invention.

As shown in FIG. 5, the first fixing part 30 may include a first fixing frame 31 detachably fitted and fixed to the first fixing protrusion 14, and a first support protrusion 33 protruding and fixed to a side surface of the first fixing frame 31, and inserted and fixed to the window.

The first fixing frame 31 has opposite both edges that are bent, and the both bent ends may be detachably fitted and fixed to the first fixing protrusion 14.

In other words, the bent end of the first fixing frame 31 has a first locking protrusion 31*a* formed therein, and may be detachably fitted and fixed to a locking groove formed in the first fixing protrusion 14.

A first protrusion 31*b* may protrude from an upper portion of the first fixing frame 31, and may be formed in a lower portion thereof with a first insertion groove 317. Accordingly, the first protrusions 31*b* of the first fixing frame 31 are inserted into the first insertion grooves 317 in a state in which a plurality of the first fixing frames are arranged vertically, so that stable upper and lower fitting and fixing may be facilitated.

The first support protrusion 33 may protrude from the side surface of the first fixing frame 31.

The first support protrusion 33 protrudes from the side surface of the first fixing frame 31, and will be exemplarily described in the present embodiment as integrally protruding from a side surface of the first support protrusion 33. However, the first support protrusion 33 may be appropriately modified and applied to be detachably fixed to the first fixing frame 31.

The second fixing part 40 may be detachably fitted and fixed to the second fixing protrusion 16 from a side surface of the filter frame 10 at a position opposite to the first fixing part 30.

Figure 6:
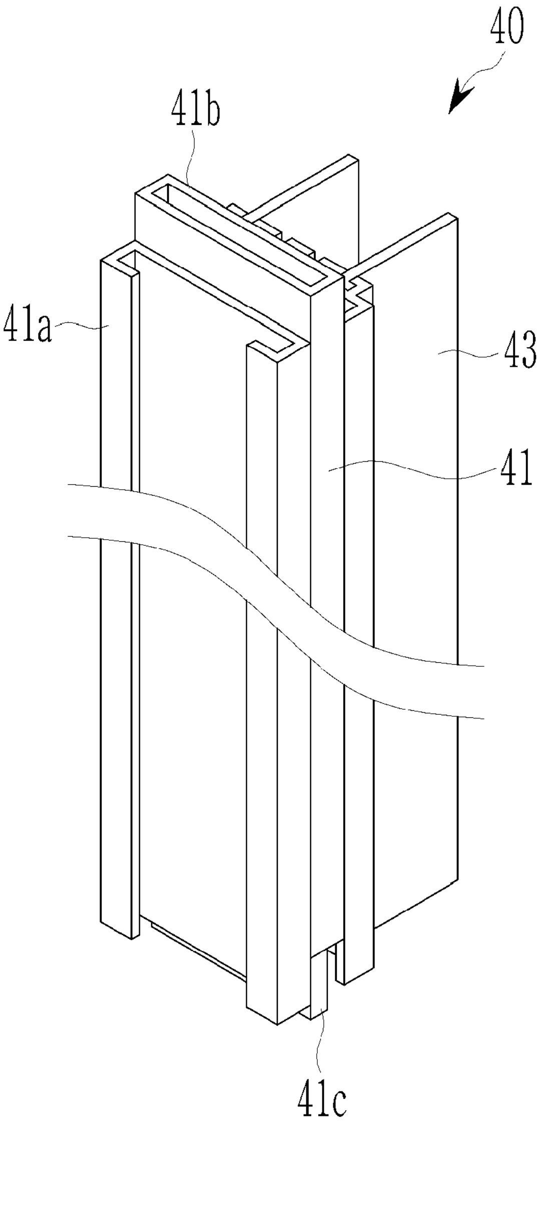
FIG. 6 is a perspective view schematically showing a main portion of a second fixing part according to the first embodiment of the present invention.

FIG. 6 is a perspective view schematically showing a main part of a second fixing part according to the first embodiment of the present invention.

As shown in FIG. 6, the second fixing part 40 may include a second fixing frame 41 detachably fitted and fixed to the second fixing protrusion 16, and a plurality of second support protrusions 43 detachably protruding and fixed to a side surface of the second fixing frame 41, and inserted and fixed to the window frame on the other side.

The second fixing frame 41 has opposite both edges that are bent, and the bent both ends have a second locking protrusion 41*a* formed therein, so as to be detachably fitted and fixed to the second fixing protrusion 16.

A second protrusion 41*b* may protrude from an upper portion of the second fixing frame 41, and may be formed in a lower portion thereof with a second insertion groove 41*c*. Accordingly, the second fixing frame 41 is inserted into the second insertion grooves 41*c* in a state in which a plurality of the second fixing frames 41 are arranged vertically, so that stable fitting and fixing may be facilitated.

Meanwhile, an insertion protrusion 19 may protrude from a lower portion of the filter frame 10.

Two insertion protrusions 19 may protrude from both edge sides of the lower portion of the filter frame 10, respectively.

Accordingly, the insertion protrusion 19 protrudes from the lower portion of the filter frame 10. Thus, when a plurality of filter frames 10 are stacked vertically, the upper portion of the filter frame 10 positioned therebelow is inserted to the insertion protrusion 19, so that a stable stacking may be achieved.

In addition, a protrusion formed on the window frame 13 may be slidably inserted into the insertion protrusion under the stacked air filter module 20. A surface coming into contact with the protrusion formed on the window frame in an inner surface of the insertion protrusion 19 may be processed with a magnetic member or a silicon surface, so that outside air may be prevented from being introduced indoors, and solid fixation may be facilitated without shaking vertically.

As described above, the filter frame 10 may be installed between the window 11 and the window frame 13 in a state that at least two filter frames are stacked vertically.

The handle portion 27 may protrude from the side surface of the filter frame 10. Accordingly, a process of stacking or separating the filter frame 10 may be stably performed.

Meanwhile, according to the assembly type ventilation device 100 for windows and doors of the present embodiment, insulation paint is applied to the entire surface including the opening/closing part 24, so that an indoor temperature may be prevented from dropping in winter.

As described above, the assembly type ventilation device 100 for windows and doors of the present embodiment is installed in a detachable and prefabricated manner between the window and window frame, so as to be easily installed on windows having various sizes with various heights and widths.

Accordingly, the outdoor air may be stably supplied indoors by filtering pollutants such as fine dust in the air while discharging indoor pollutants to the outside, so that effective ventilation may be facilitated, and user satisfaction may be improved.

Figure 7:
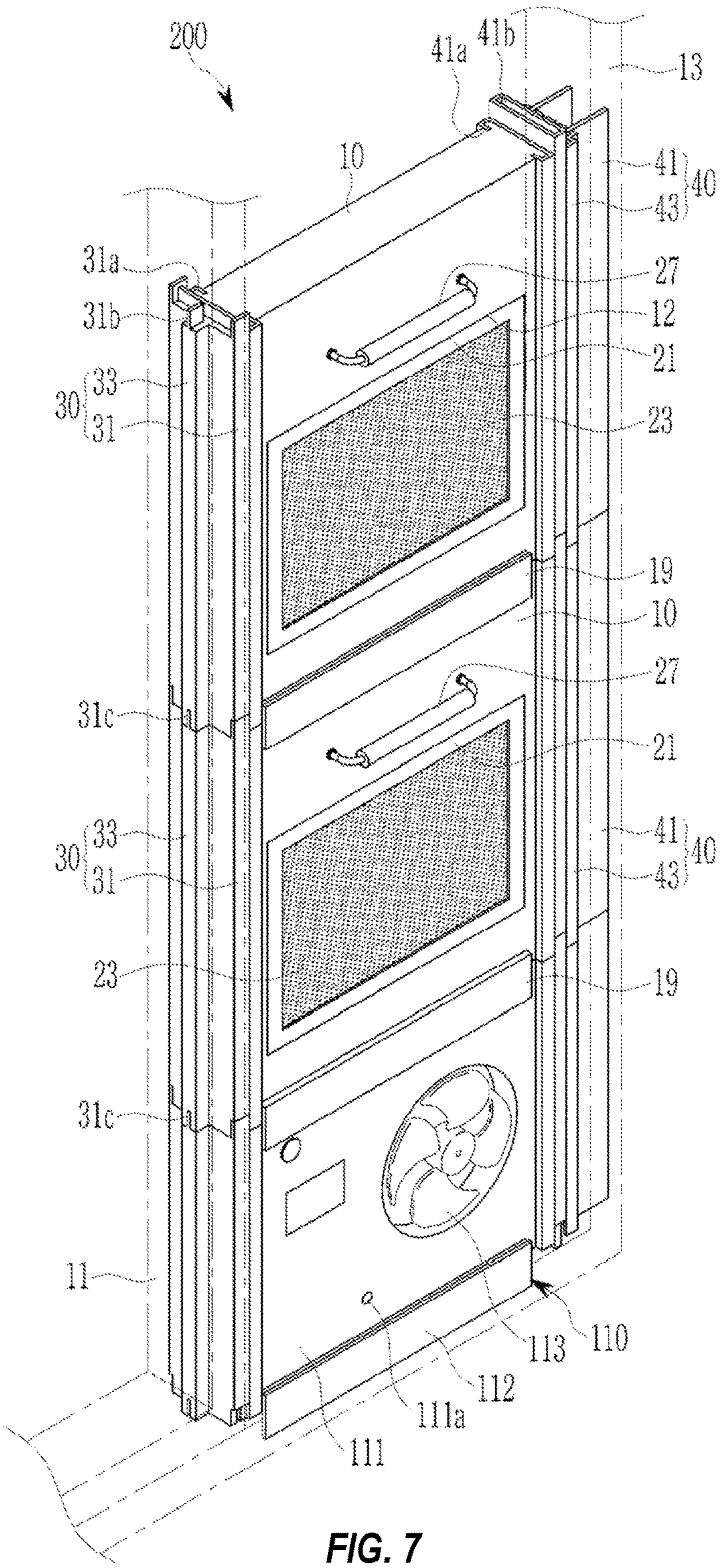
FIG. 7 is a perspective view schematically showing a state in which an assembly type ventilation device for windows and doors according to the second embodiment of the present invention is installed.
Figure 8:
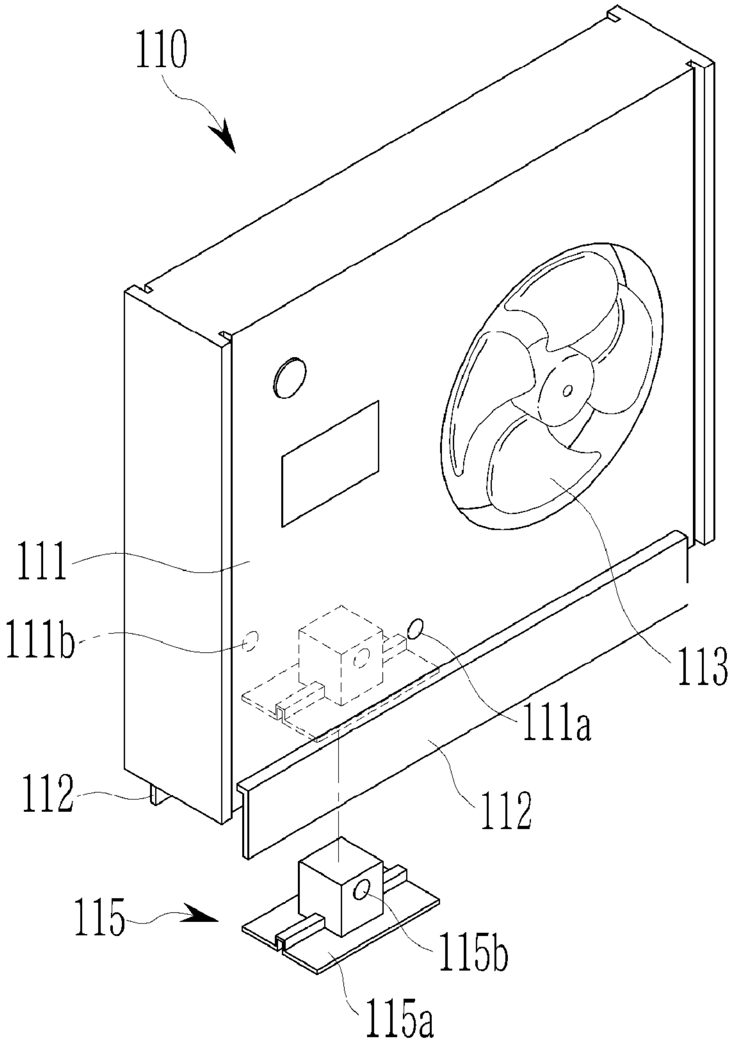
FIG. 8 is a perspective view schematically showing at ventilation module of FIG. 7.

FIG. 7 is a perspective view schematically showing a state in which an assembly type ventilation device for windows and doors according to the second embodiment of the present invention is installed. FIG. 8 is a perspective view schematically showing at ventilation module of FIG. 7. The same reference numerals in FIGS. 1 to 6 refer to the same or similar numerals of the same or similar functions. Hereinafter, detailed descriptions of the same reference numerals will be omitted.

As shown in FIGS. 7 and 8, a ventilation module 110 may be detachably installed in the assembly type ventilation device 200 for windows and doors according to the second embodiment of the present invention.

The ventilation module 110 may include a ventilation frame 111 having an upper side inserted to the insertion protrusion 19 of the filter frame, and provided at a lower portion thereof with a fixing protrusion 112 fitted with the window frame, a ventilation fan 113 installed in the ventilation frame 111, and a fine dust measurement part 115 movably installed along the window frame while being inserted inside the ventilation frame 111, and installed therein with a fine dust sensor 115*b* to allow the ventilation fan 113 to be controlled and driven when fine dust contained in the outside air is less than a set concentration.

The ventilation frame 111 is installed under the filter frame 10, and may be installed at a position between the window frame 13 and the filter frame 10. A first communication hole 111*a* communicating with an outdoor side and a second communication hole 111*b* communicating with an indoor side may be formed on side surfaces of the ventilation frame 111.

An installation space is formed inside the ventilation frame 111 so that the ventilation fan 113 may be installed therein.

The ventilation fan 113 is selectively operated by a sensing signal of the fine dust sensor 115*b*, and activated to ventilate indoor air when the concentration of fine dust in the atmosphere is less than or equal to the set concentration.

In addition, the ventilation fan 113 may be actuated when the concentration of fine dust in the indoor air is greater than or equal to the set concentration so as to operate to discharge indoor pollutants into the atmosphere.

The fine dust measurement part 115 may include a moving frame 115*a* movably installed along an inner rail installed inside the ventilation frame 111, and fine dust sensors 115*b* installed on opposite both sides of the moving frame 115*a*.

The moving frame 115*a* is installed to be selectively movable along the inner rail installed inside the ventilation frame 111, and the fine dust sensors 115*b* may be selectively exposed, inside the ventilation frame 111, to the first communication hole 111*a* and the second communication hole 111*b* of the ventilation frame 111.

Accordingly, the concentration of outdoor fine dust may be measured when the fine dust sensor 115*b* is exposed to the first communication hole 111*a*, and the concentration of indoor fine dust may be measured when the fine dust sensor 115*b* is exposed to the second communication hole 111*b*.

Meanwhile, the sensing signal measured by the fine dust sensor 115*b* may be remotely received by the user using a receiving mechanism such as a smartphone application, so that the user may remotely control the ventilation fan 113 according to the sensing signal from the fine dust sensor.

Meanwhile, the ventilation module may separately deploy two structures such as an exhaust-dedicated fan (a fan operated according to the results of indoor air quality measurement to discharge indoor pollutants) and an intake-dedicated fan (operated for quick ventilation to introduce air having passed through the filter, and automatically inactivated upon high concentration level of external fine dust), or a fan for both exhaust and intake may be installed according to the results of indoor and outdoor air quality measurement to selectively operate the exhaust or intake. In addition, the air filter is inserted at an outer portion of the intake fan, so that fresh air where fine dust may be introduced. The intake fan may be configured to automatically stop the operations thereof in the case of high concentration based on the measurement result of outdoor air quality, and may be configured to allow a mode of the opening/closing part of the cover frame to be switched into a closed mode.

Figure 9:
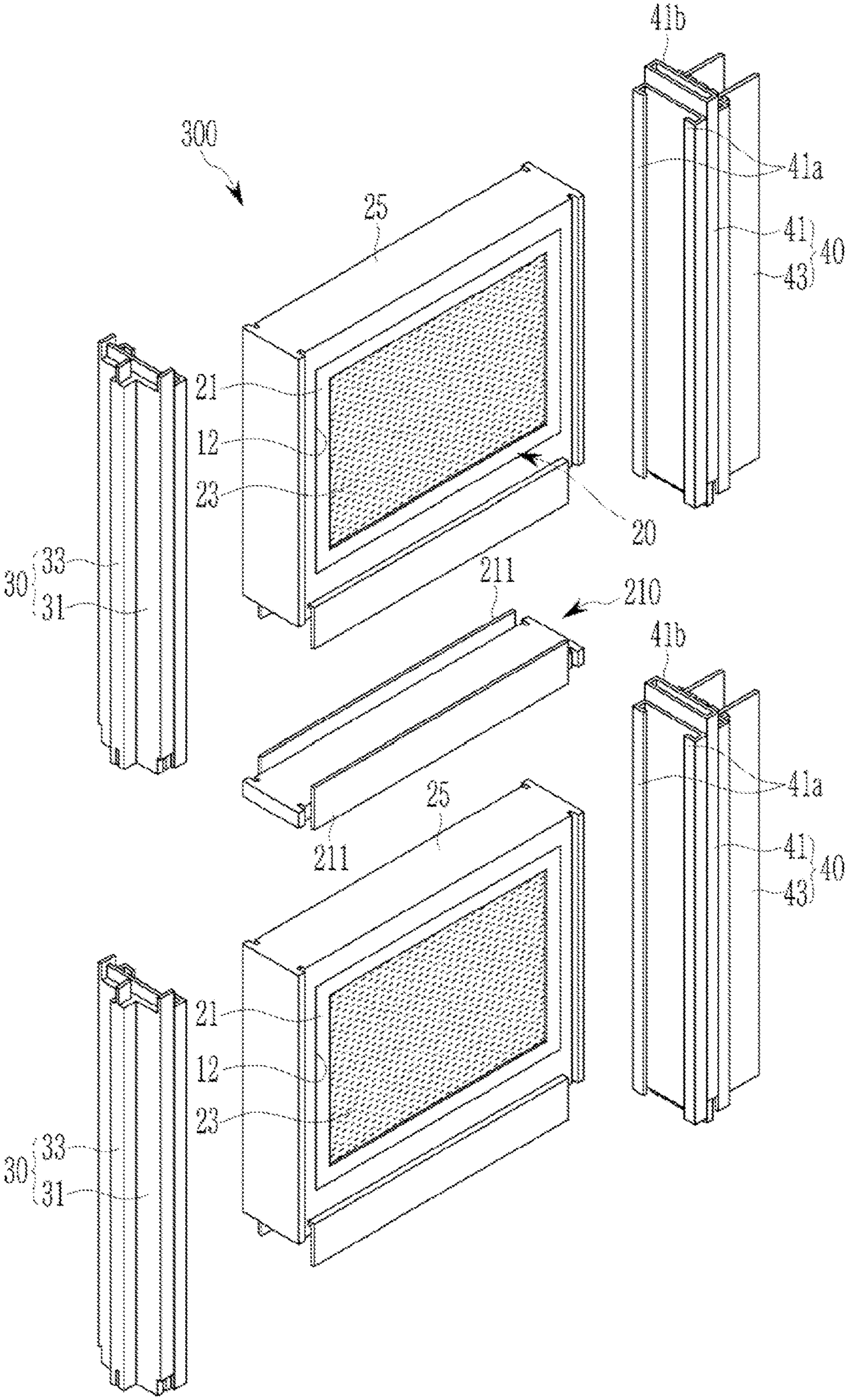
FIG. 9 is an exploded perspective view schematically showing a main part and a state in which an assembly type ventilation device for windows and doors according to the third embodiment of the present invention is installed.

FIG. 9 is an exploded perspective view schematically showing a main part and a state in which an assembly type ventilation device for windows and doors according to the third embodiment of the present invention is installed. The same reference numerals in FIGS. 1 to 8 refer to the same or similar numerals of the same or similar functions. Hereinafter, detailed descriptions of the same reference numerals will be omitted.

As shown in FIG. 9, the assembly type ventilation device 300 for windows and doors according to the third embodiment of the present invention includes: a guide frame 210 installed while coming into contact with the upper and lower portions of the air filter module 20, and having opposite both edges from which guide protrusions 211 extending to surfaces of the air filter module 20 protrude; a first fixing part 30 installed on one side of the guide frame 210 and fixed to a window; and a second fixing part 40 installed on an opposite side of the guide frame 210 and fixed to a window frame.

The guide frame 210 may be installed to guide a state in which the air filter modules 20 are stacked vertically.

The guide frame 210 may be installed to allow the air filter modules 20 to be stably stacked between the first fixing part 30 and the second fixing part 40 while supporting the upper and lower portions of the air filter modules 20.

In other words, the guide frame 210 may be installed such that a surface thereof is supported by and comes into contact with a bottom surface of the air filter module 20, and a bottom surface of the guide frame is supported by and comes into contact with a top surface of the air filter module 20.

The upper and lower surfaces of the guide frame 210 may be coated with silicone to apply frictional force to the air filter modules in a contact state so that the air filter modules may be stably positioned without being slid.

The guide protrusions 211 protrude from the guide frame 210 upward and downward, so that the side surfaces of the air filter modules 20 in a stacked state may be stably supported.

Figure 10:
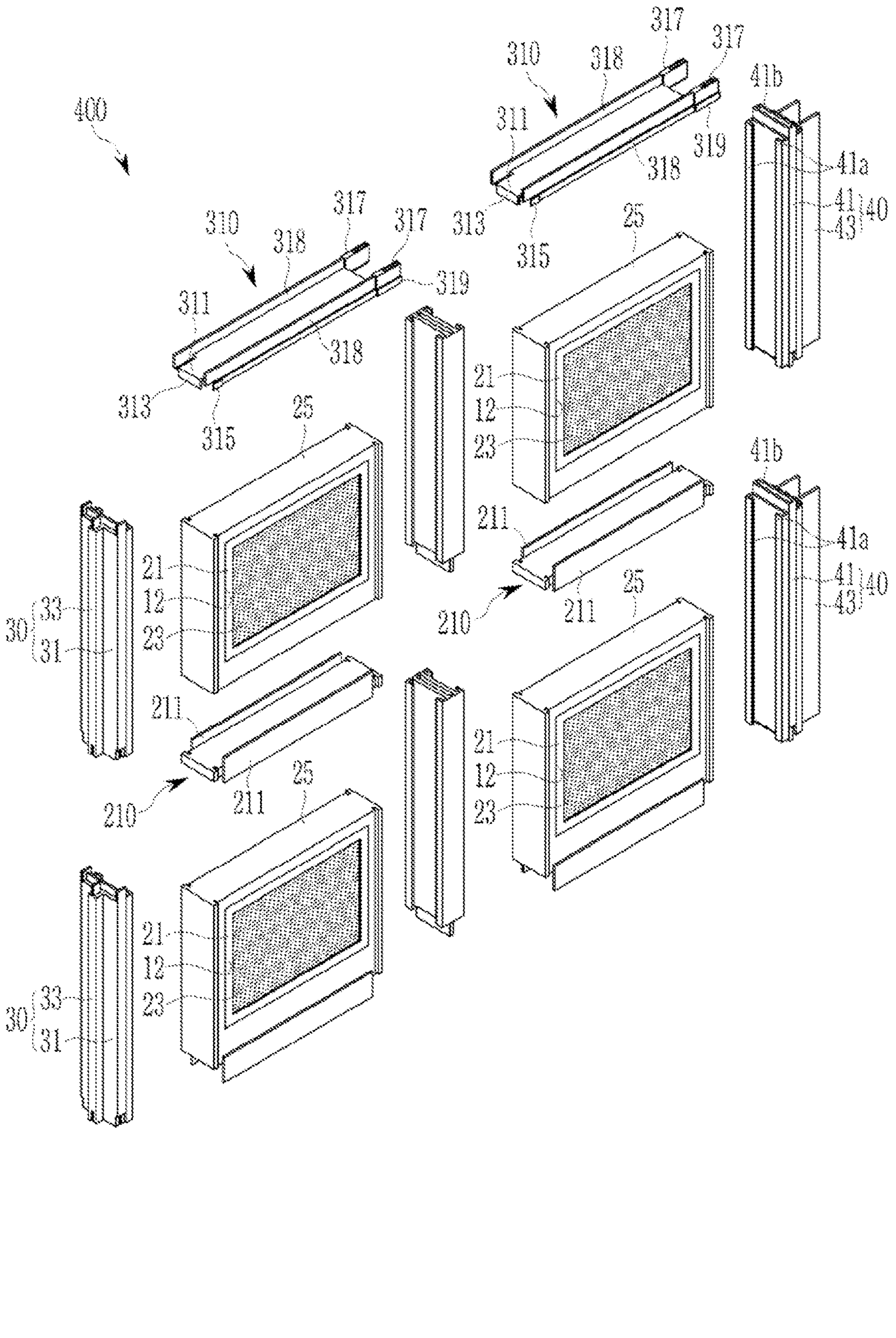
FIG. 10 is an exploded perspective view schematically showing a main part and a state in which an assembly type ventilation device for windows and doors according to a fourth embodiment of the present invention is installed.

FIG. 10 is an exploded perspective view schematically showing a main part and a state in which an assembly type ventilation device for windows and doors according to a fourth embodiment of the present invention is installed. The same reference numerals in FIGS. 1 to 9 refer to the same or similar numerals of the same or similar functions. Hereinafter, detailed descriptions of the same reference numerals will be omitted.

As shown in FIG. 10, in the assembly type ventilation device 400 for windows and doors according to a fourth embodiment of the present invention, a connection frame 310 may be installed on an uppermost side of the stacked air filter modules 20.

The connection frame 310 may include a connection body 311 having a bottom coming into contact with the upper side of the air filter module 20, and having connection protrusions 318 protruding from edges thereof in a longitudinal direction; a bent portion 313 bent at one side of the connection body 311 so as to be locked and fixed to an upper portion of the first fixing part 30; coupling protrusions 315 protruding from the one side of the connection body 311 while being spaced apart from both sides of the bent portion 313; a first insertion groove 317 formed on an opposite side of the connection body 311; and a second insertion groove 319 formed under the first insertion groove 317 on the opposite side of the connection body 311.

A plurality of connection bodies 311 may be installed to be disassembled or coupled in an extended state. To this end, the bent portion 313 and the coupling protrusions 315, and the first insertion groove 317 and the second insertion groove 319 may be formed on one side and the other side of the connection body 311, respectively.

The connection protrusions 318 protruding in a bent state may be formed at the edges in the longitudinal direction on the upper side of the connection body 311.

The connection body 311 is installed to connect a plurality of the air filter modules 20 in a laterally combined state, and the bent portion 313 and the coupling protrusions 315 may be formed on one side of the connection body.

The bent portion 313 may be bent downward from the one side of the connection body 311 and fixed to the first fixing part 30. In addition, the coupling protrusions 315 protrude from sides of the bent portion 313, and may be inserted and fixed to the first insertion groove 317 formed in another adjacent connection body 311.

The first insertion groove 317 and the second insertion groove 319 may be formed on the other side of the connection body 311.

The first insertion groove 317 is inserted into the connection protrusion 318 formed in the adjacent connection body 311, and the second insertion groove 319 is inserted into the coupling protrusion 315 formed in the adjacent connection body 311, in which the plurality of connection bodies 311 may be detachably connected in an adjacent state.

Figure 11:
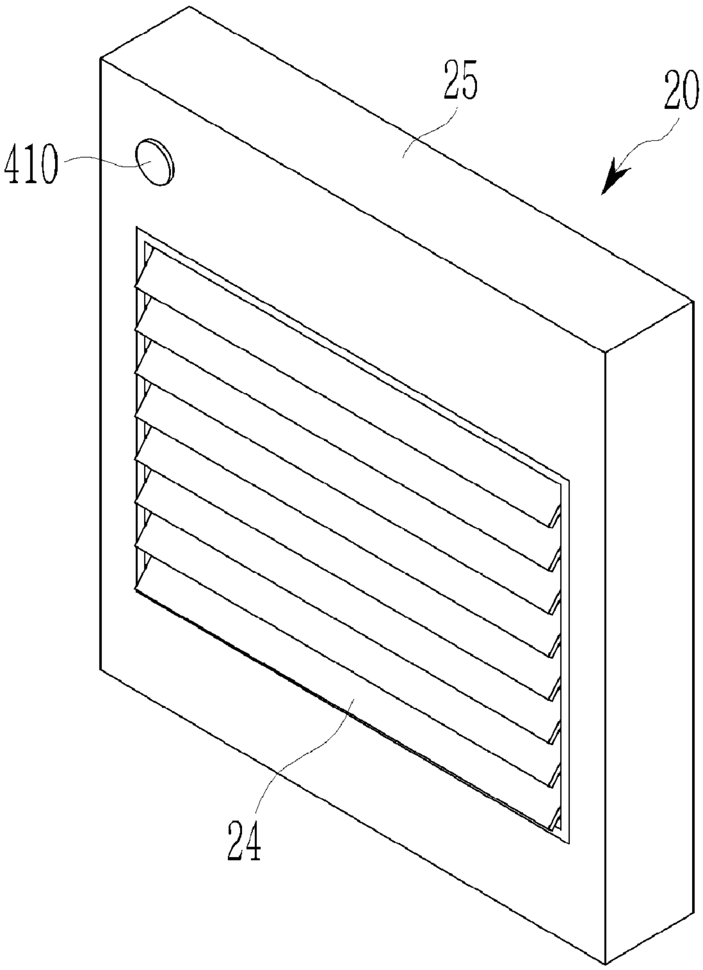
FIG. 11 is a perspective view schematically showing an air filter module of an assembly type ventilation device for windows and doors according to a fifth embodiment of the present invention.

FIG. 11 is a perspective view schematically showing an air filter module of an assembly type ventilation device for windows and doors according to a fifth embodiment of the present invention. The same reference numerals in FIGS. 1 to 10 refer to the same or similar numerals of the same or similar functions. Hereinafter, detailed descriptions of the same reference numerals will be omitted.

As shown in FIG. 11, the opening/closing part 24 of the assembly type ventilation device for windows and doors according to a fifth embodiment of the present invention may be automatically opened and closed according to driving of the driving part 410.

The driving part 410 is operated according to the sensing signal of the fine dust sensor 115*b*, and may be operated when the concentration of fine dust in the atmosphere is higher than or equal to the set concentration to perform a closing operation of the opening/closing part 24. In addition, the driving part 410 may be driven to operate the ventilation fan when the pollution level of the indoor air rises to a predetermined level or higher.

Accordingly, the closing operation of the opening/closing part 24 may be automatically performed according to the concentration of fine dust in the atmosphere, so that the indoor air pollution due to air pollution may be effectively prevented.

Figure 12:
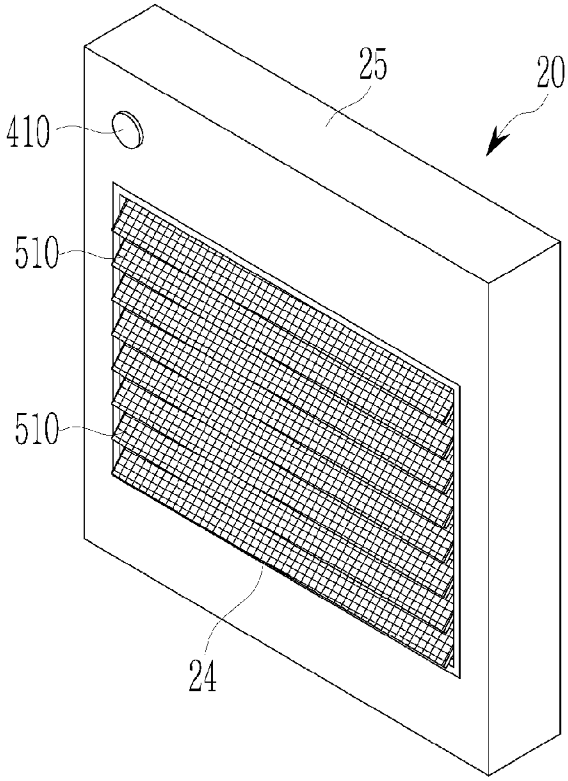
FIG. 12 is a perspective view schematically showing an air filter module of an assembly type ventilation device for windows and doors according to a sixth embodiment of the present invention.

FIG. 12 is a perspective view schematically showing an air filter module of an assembly type ventilation device for windows and doors according to a sixth embodiment of the present invention. The same reference numerals in FIGS. 1 to 11 refer to the same or similar numerals of the same or similar functions. Hereinafter, detailed descriptions of the same reference numerals will be omitted.

As shown in FIG. 12, a solar panel 510 may be installed in the opening/closing part 24 of the air filter module 20 of the assembly type ventilation device for windows and doors according to a sixth embodiment of the present invention.

The solar panel 0 is installed on an outer surface of the opening/closing part 110, so that power for driving of the driving part may be easily supplied.

Figure 13:
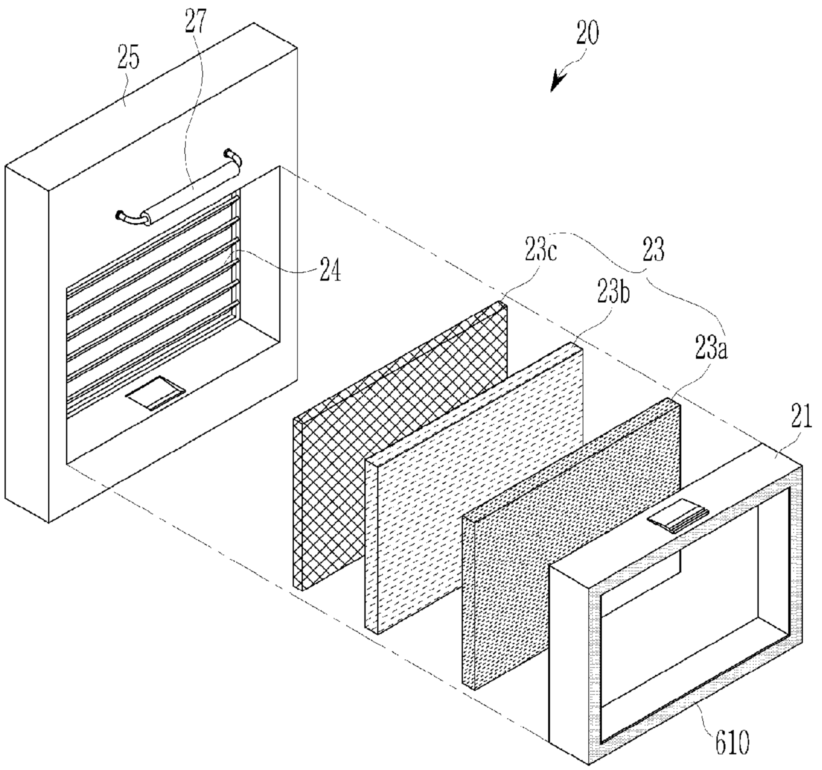
FIG. 13 is an exploded perspective view schematically showing an air filter module of an assembly type ventilation device for windows and doors according to a seventh embodiment of the present invention.

FIG. 13 is an exploded perspective view schematically showing an air filter module of an assembly type ventilation device for windows and doors according to a seventh embodiment of the present invention. The same reference numerals in FIGS. 1 to 12 refer to the same or similar numerals of the same or similar functions. Hereinafter, detailed descriptions of the same reference numerals will be omitted.

As shown in FIG. 13, a display part 610 having the same or similar color as a color in a polluted state of the air filter 23 may be attached to the filter frame 10 of the assembly type ventilation device for windows and doors according to a seventh embodiment of the present invention.

Accordingly, when the color of the polluted state of the air filter 23 is the same as or similar to the color of the display part 610 of the filter frame 10, the air filter 14 may be checked as being polluted so that the air filter 23 may be quickly replaced.

Figure 14:
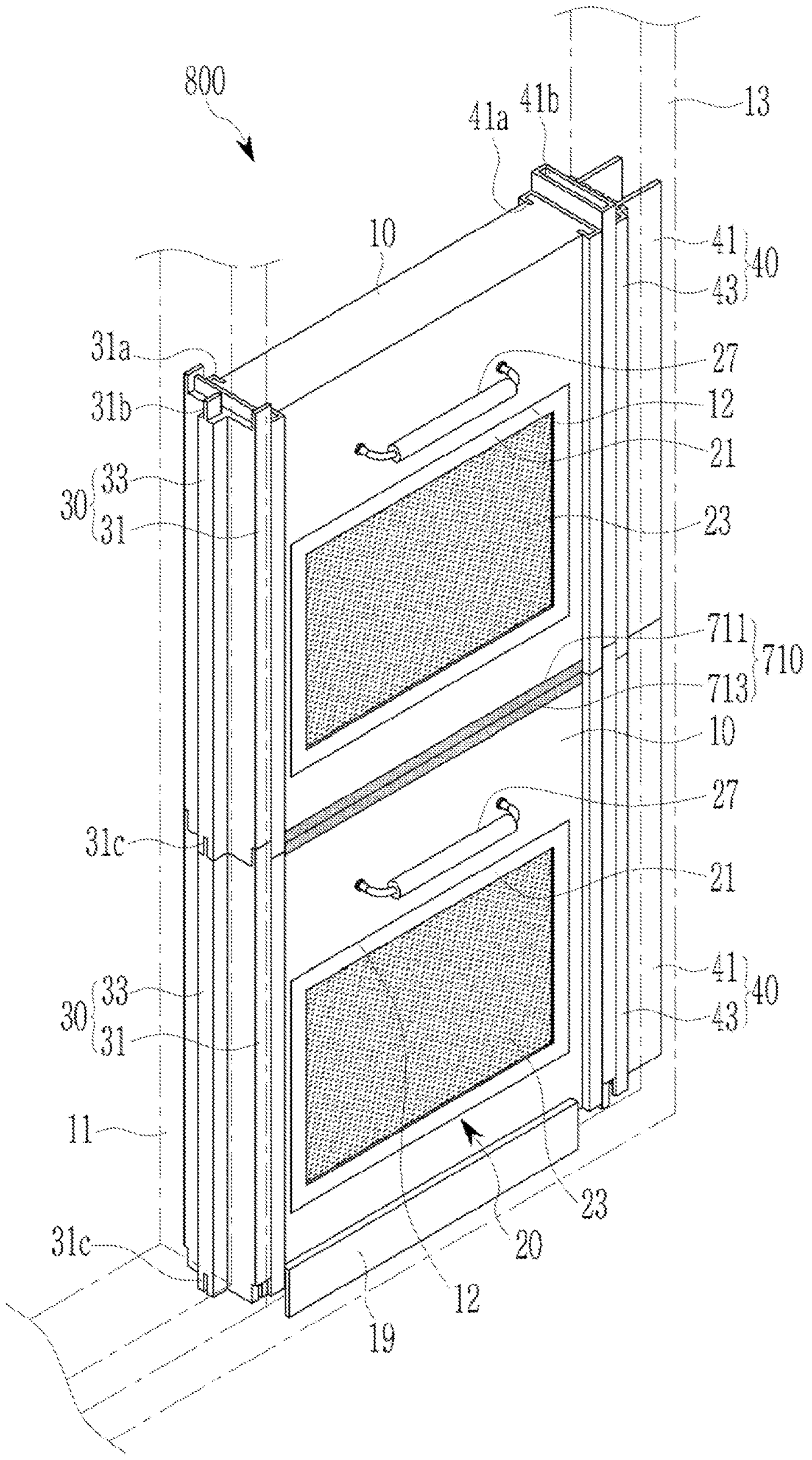
FIG. 14 is a perspective view schematically showing an air filter module of an assembly type ventilation device for windows and doors according to an eighth embodiment of the present invention.

FIG. 14 is a perspective view schematically showing an air filter module of an assembly type ventilation device for windows and doors according to an eighth embodiment of the present invention. The same reference numerals in FIGS. 1 to 13 refer to the same or similar numerals of the same or similar functions. Hereinafter, detailed descriptions of the same reference numerals will be omitted.

As shown in FIG. 14, the filter frame 10 of the assembly type ventilation device 800 for windows and doors according to an eighth embodiment of the present invention may include a plurality of filter frames stacked vertically between the first fixing part 30 and the second fixing part 40 in a detachable state by the magnetic member 710.

The magnetic member 710 may include a first magnetic member 711 fixed to an upper surface of the filter frame 10, and a second magnetic member 713 fixed to a lower surface of the filter frame 10.

In other words, the first magnetic member 711 is attached to a lower surface of any one of the stacked filter frames 10, and the second magnetic member 713 is attached to a lower surface of another one of the stacked filter frames 10, so that the filter frames 10 may be installed in a state detachable to each other by magnetic force.

Meanwhile, facing surfaces of the first magnetic member 711 and the second magnetic member 713 in contact with each other may be coated with silicone, so that more robust fixation may be facilitated.

The invention claimed is:

1. An assembly type ventilation device for windows and doors, the assembly type ventilation device comprising:

a filter frame formed with an insertion part to which an air filter module is detachably inserted and fixed;

a first fixing part installed on one side of the filter frame and fixed to a window; and a second fixing part installed on an opposite side of the filter frame and fixed to a window frame, wherein the filter frame includes a plurality of filter frames stacked vertically and detachably fixed to each other by a magnetic member, and the magnetic member includes:

a first magnetic member fixed to an upper surface of the filter frame; and a second magnetic member fixed to a lower surface of the filter frame, in which surfaces facing the first magnetic member and the second magnetic member are coated with silicone while the filter frames are stacked.

2. The assembly type ventilation device of claim 1, wherein a first fixing protrusion protrudes from the one side of the filter frame, and the first fixing part includes:

a first fixing frame detachably fitted and fixed to the first fixing protrusion; and a first support protrusion protruding and fixed to a side surface of the first fixing frame, and inserted and fixed to the window.

3. The assembly type ventilation device of claim 2, wherein a second fixing protrusion protrudes from the opposite side of the filter frame, and the second fixing part includes:

a second fixing frame detachably fitted and fixed to the second fixing protrusion; and a plurality of second support protrusions detachably fixed to the window frame.

4. The assembly type ventilation device of claim 1, wherein insertion protrusions protrude from opposite edge sides of a lower portion of the filter frame.

5. The assembly type ventilation device of claim 4, wherein;

the filter frame includes a plurality of filter frames stacked vertically, and the upper portion of the filter frame at a lower position is inserted and fixed to the insertion protrusions while the filter frames are stacked.

6. The assembly type ventilation device of claim 5, wherein a ventilation module is detachably installed under the filter frame, and the ventilation module includes:

a ventilation frame having an upper side with which the insertion protrusion of the filter frame is fitted, and provided at a lower portion thereof with a fixing protrusion fitted with the window frame;

a ventilation fan installed in the ventilation frame; and a fine dust measurement part movably installed inside the ventilation frame while being inserted inside the ventilation frame, and installed therein with a fine dust sensor to control and drive the ventilation fan when fine dust contained in outside air is less than a set concentration or fine dust in indoor air is higher than the set concentration.

7. The assembly type ventilation device of claim 6, wherein the air filter module includes:

a module frame inserted and fixed to the insertion part of the filter frame;

a plurality of air filters inserted and fixed to the module frame; and a cover frame fixed to the module frame and installed therein with an opening/closing part.

8. The assembly type ventilation device of claim 7, further comprising:

a driving part receiving a sensing signal of the fine dust sensor to close the opening/closing part when the concentration of fine dust in atmosphere is higher than the set concentration.

9. An assembly type ventilation device for windows and doors, the assembly type ventilation device comprising:

a guide frame installed at a position between stacked air filter modules of the assembly type ventilation device of claim 1, the guide frame having opposite edges from which guide protrusions extending to surfaces of the air filter module protrude;

the first fixing part installed on one side of the guide frame and fixed to the window; and the second fixing part installed on an opposite side of the guide frame and fixed to the window frame.

10. The assembly type ventilation device of claim 9, further comprising:

a connection frame fixed to a stacked upper portion of the filter frame, wherein the connection frame includes:

a connection body having a bottom coming into contact with the upper side of the air filter module, and having connection protrusions protruding from edges thereof in a longitudinal direction;

a bent portion bent at one side of the connection body so as to be locked and fixed to an upper portion of the first fixing part;

coupling protrusions protruding from the one side of the connection body while being spaced apart from both sides of the bent portion;

a first insertion groove formed on an opposite side of the connection body; and a second insertion groove formed under the first insertion groove on the opposite side of the connection body.

* * * * *